Oct. 15, 1929.    C. B. GARDNER, JR    1,731,303
SELF PROPELLED VEHICLE
Filed Feb. 16, 1927
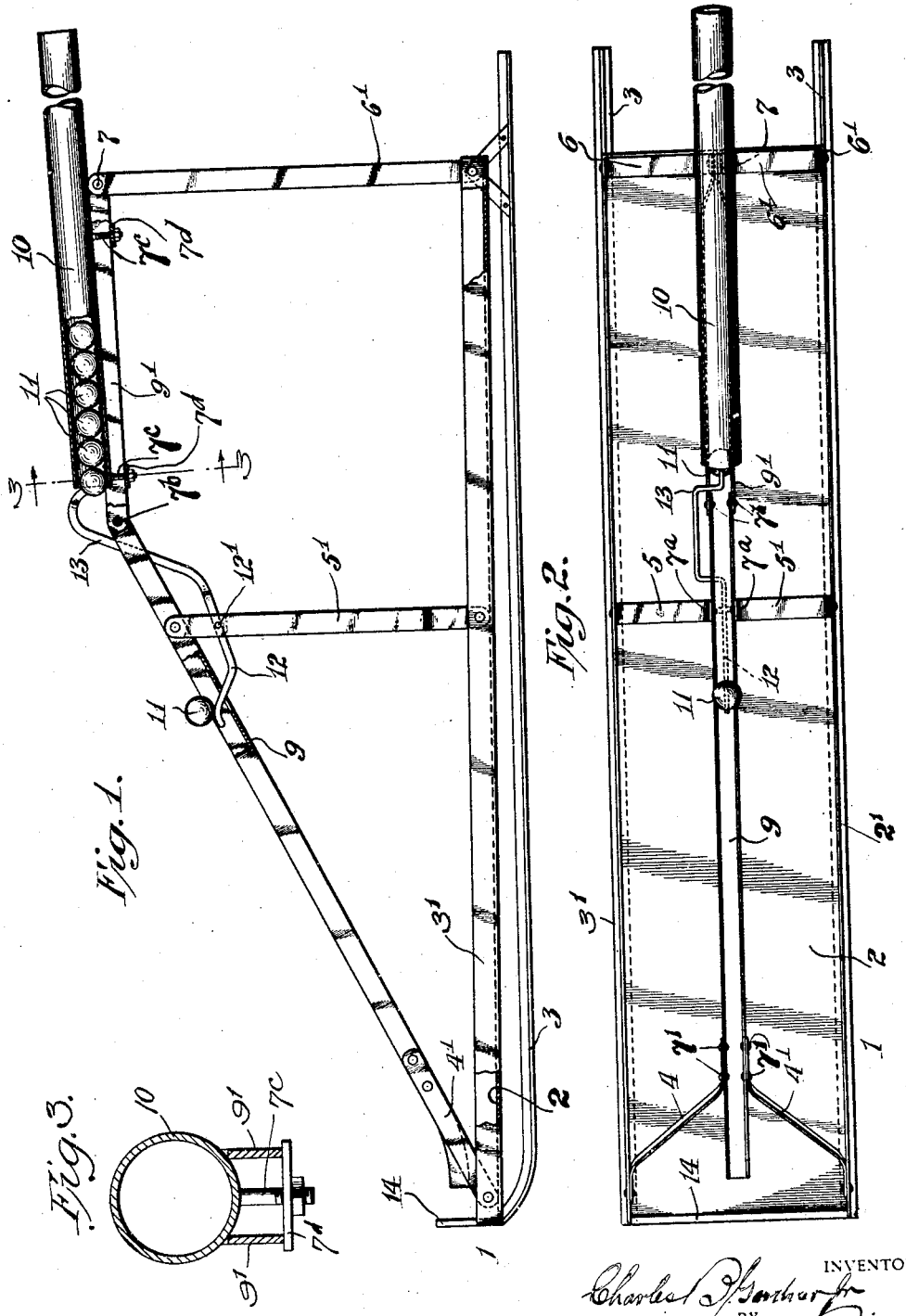

Patented Oct. 15, 1929

1,731,303

UNITED STATES PATENT OFFICE

CHARLES B. GARDNER, JR., OF LONG BEACH, CALIFORNIA

SELF-PROPELLED VEHICLE

Application filed February 16, 1927. Serial No. 168,494.

This invention relates to improvements in self-propelled vehicles.

The object of this invention is to enable the propulsion of a vehicle such as a sleigh, iceboat, wagon, aircraft or the like by direct successive impacts from a series of moving bodies or masses and preferably from a series of bodies rolling along an inclined plane or arcuate surface, whereby such a vehicle may be moved without reliance on the traction or grip of the propelling device of such vehicle with the surrounding or supporting medium, and the ultimate speed will consequently not be limited by the grip of such propelling device on such surrounding medium, and the only speed limiting factors will be the skin friction of the vehicle with the supporting and/or surrounding mediums.

Another object of my invention is to produce a device of this character in which a magazine filled with rolling bodies will be supported at the top of an inclined or arcuate runway and these bodies will be successively and automatically released to permit the rolling down thereof in suitably timed succession and preferably one of such rolling bodies is utilized to release the next succeeding body which in turn will release its successor until all of the bodies in the magazine have been released.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a side elevation of a device embodying my invention, a part of the ball runway being broken away to show the contact of the ball with the releasing or feeding element;

Fig. 2 is a plan view of the device shown in Fig. 1; and

Fig. 3 is a section on the line 3—3 of Fig. 1, looking in the direction of the arrow.

Referring now to these drawings, which illustrate a preferred embodiment of my invention, 1 indicates a suitable vehicle which in the embodiment shown, comprises a sleigh composed of a platform 2 supported on runners 3. This platform is preferably provided with angle irons to form upwardly-extending flanges 3' and produce an enclosed shallow box structure. Erected on the platform 2 of the sleigh 1, in any suitable manner, and, as shown, by a series of inclined struts 4, 4', 5, 5' and 6, 6' is a runway 9 comprising a channel-shaped member connection to the struts 4, 4' and 5, 5' by bolts 7', 7$^a$ and also having its rear end fastened by bolts 7$^b$ to a magazine-supporting structure 9' composed of two spaced bars bent to bring the same together at their rear ends and fastened at said rear ends to the struts 6, 6' by bolt 7. At the upper end of the runway is supported a magazine 10 enclosing a series of balls 11 arranged to roll down the runway 9 and to be successively released from the magazine by any suitable mechanism. This magazine 10, is as illustrated, fastened to the magazine-supporting structure 9' by bolts 7$^c$ and washers 7$^d$, the heads of the bolts being first fastened by soldering or welding on the outer surface of the tubular magazine 10. As shown, the releasing mechanism comprises a trip lever 12 pivoted at 12' between the inclined members 5, 5' and having a releasing tail portion 13 normally engaging the first or foremost ball in the magazine. It will be understood that in order to start the device, the trip lever is actuated by either depressing the forward end or raising the rear end thereof to allow a ball to run down the runway. This ball, during its passage along the runway, will trip the lever 12, swing it on its pivot 12', cause the tail to be raised and release the first ball in the magazine, which in its turn upon the passing down the runway, will release the next succeeding ball and so on until the various balls in the magazine have been utilized. A ball thus running down the runway will have a degree of speed which will be accelerated in proportion with the length and height of the runway and I provide at the forward portion of the vehicle a buffer member preferably comprising a plate 14 preferably connected at opposite sides directly with the vehicle. The impact of such moving masses or bodies against a buffer or the like supported on the vehicle, will cause a forward movement of the vehicle, as a considerable part of the forward impulse from such movement of the ball or other moving mass will be transmitted through the buffer to the vehicle on which it is mounted.

It will be obvious that while the impact from a single ball will only move the vehicle 1 for a very short distance, a series of these impacts successively applied will accelerate the speed and produce a continuous movement of constantly-increasing speed. For example, consider the vehicle 1 as standing still when the first ball being released strikes the buffer 14. The vehicle will, by the impact, be propelled forwardly at a given rate of speed $a$. As the vehicle and magazine will then be moving at the given speed $a$ when the next ball from the magazine is released at the same speed as the first ball, the speed produced by the impact of the second ball will, therefore, be added to the speed produced by the impact of the first ball and this gives us the given speed $a$ plus the speed of the second ball. The vehicle is thus moved along with constant acceleration in relation to the ice or other surrounding medium until the power absorbed by the skin friction of the vehicle on the ice and surrounding medium balances the force with which the vehicle is moving. The movement of the vehicle is not, therefore, dependent upon any traction or grip of the runners or other parts of the vehicle upon the ice or surrounding medium.

In the preferred embodiment of my invention, I preferably provide a buffer formed of a rigid material such as steel and I am thus enabled to take advantage to the greatest possible degree of the force exerted on said buffer. It will be obvious that while a single ball will only move the vehicle for a very short distance, a series of these impacts successively applied will be truly cumulative in their effect and when properly timed, the succeeding impulses may be so applied as to increase the speed of the vehicle and to enable a speed or speeds to be reached of very high velocity and a means is provided for enabling such high speeds to be reached which will have very great efficiency. It will be obvious that a ball, after impact, will roll slowly to the rear of the platform without any material effect upon the forward impulse which it has just given and, furthermore, that the balls may be elevated by hand into the magazine.

Having described my invention, I claim:—

1. A self-propelled vehicle having an impact member and means for guiding a series of movable bodies to strike said impact member successively to produce a series of impacts sufficient to propel the vehicle.

2. A self-propelled vehicle embodying a suitable body having an impact member and a guideway extending upwardly from said impact member, and means for feeding movable bodies to run along said guideway for the purpose of striking said impact member successively to produce a series of impulses for the purpose of propelling the vehicle.

3. A self-propelled vehicle embodying a suitable body having an impact member, an inclined runway extending upwardly from said impact member, and means for feeding rolling bodies to said runway to cause such bodies to strike the impact member successively and to produce a series of impulses for the purpose of propelling the vehicle.

4. A self-propelled vehicle embodying a suitable body having an impact member and a guideway extending upwardly from said impact member, and a magazine for feeding movable bodies to run along said guideway for the purpose of striking said impact member successively to produce a series of impulses for the purpose of propelling the vehicle.

5. A self-propelled vehicle embodying a suitable body having an impact member, an inclined runway extending upwardly from said impact member, and a magazine for feeding movable bodies to run along said runway for the purpose of striking said impact member successively to produce a series of impulses for the purpose of propelling the vehicle.

6. A self-propelled vehicle embodying, in combination, a suitable body having an impact member, an inclined runway in alignment with said impact member and a ball magazine for feeding balls to said runway to cause said balls successively to strike said impact member with impacts sufficient to propel the vehicle.

In witness whereof, I have signed my name to the foregoing specification.

CHARLES B. GARDNER, Jr.